(12) United States Patent
Ogawa et al.

(10) Patent No.: US 12,311,482 B2
(45) Date of Patent: May 27, 2025

(54) REPAIR METHOD OF ROTOR

(71) Applicant: MITSUBISHI HEAVY INDUSTRIES COMPRESSOR CORPORATION, Tokyo (JP)

(72) Inventors: Kohei Ogawa, Hiroshima (JP); Hiroaki Oka, Hiroshima (JP); Hiroshi Nakajima, Hiroshima (JP); Koshiro Niihara, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 0 days.

(21) Appl. No.: 18/777,881

(22) Filed: Jul. 19, 2024

(65) Prior Publication Data

US 2025/0033150 A1 Jan. 30, 2025

(30) Foreign Application Priority Data

Jul. 26, 2023 (JP) .................. 2023-121995

(51) Int. Cl.
*B23P 6/00* (2006.01)
*B23K 26/342* (2014.01)
(Continued)

(52) U.S. Cl.
CPC .............. *B23P 6/00* (2013.01); *B23K 26/342* (2015.10); *B23P 6/007* (2013.01); *B23P 6/045* (2013.01); *B23K 2101/35* (2018.08); *B23P 6/002* (2013.01); *Y10T 29/49318* (2015.01); *Y10T 29/49728* (2015.01); *Y10T 29/49737* (2015.01);
(Continued)

(58) Field of Classification Search
CPC .. B23P 6/00; B23P 6/002; B23P 6/007; B23P 6/045; B23K 26/342; B23K 2101/35; Y10T 29/49318; Y10T 29/49728; Y10T 29/49737; Y10T 29/49742; Y10T 29/49746
See application file for complete search history.

(56) References Cited

U.S. PATENT DOCUMENTS 5,172,475 A * 12/1992 Amos ..................... F01D 5/005
228/119
2002/0161483 A1* 10/2002 Vaidyanathan .... G05B 19/4207
451/64
(Continued)

FOREIGN PATENT DOCUMENTS

EP 1623787 A1 * 2/2006 ........... B23K 1/0018
GB 2264446 A * 9/1993 .............. B23P 6/007
(Continued)

*Primary Examiner* — Jermie E Cozart
(74) *Attorney, Agent, or Firm* — Osha Bergman Watanabe & Burton LLP

(57) ABSTRACT

A repair method is a repair method of a rotor including a rotor body extending in an axial direction about an axis and a plurality of impellers arranged in the axial direction and fixed to the rotor body, the repair method including: a step of performing welding on a repair area of the rotor body to fill a damaged portion with a welded portion; a step of performing heat treatment only on the repair area in the rotor after the welding is performed; and a step of scraping a part of the welded portion after the heat treatment is performed, to form a processing surface smoothly connected to an outer surface.

4 Claims, 7 Drawing Sheets

(51) Int. Cl.
*B23P 6/04* (2006.01)
*B23K 101/34* (2006.01)

(52) U.S. Cl.
CPC .... *Y10T 29/49742* (2015.01); *Y10T 29/49746* (2015.01)

(56) References Cited

U.S. PATENT DOCUMENTS

| | | | |
|---|---|---|---|
| 2006/0067830 A1* | 3/2006 | Guo | B23K 26/342 416/229 R |
| 2006/0231535 A1* | 10/2006 | Fuesting | B23P 6/045 219/121.64 |
| 2006/0260125 A1* | 11/2006 | Arnold | B23P 6/007 29/889.1 |
| 2007/0111119 A1* | 5/2007 | Hu | C22C 38/44 430/57.8 |
| 2007/0251072 A1* | 11/2007 | Beeson | B23P 6/007 29/402.09 |
| 2007/0269608 A1 | 11/2007 | Saito et al. | |
| 2008/0028605 A1* | 2/2008 | Lutz | B23K 26/342 29/402.09 |
| 2016/0169056 A1* | 6/2016 | Luick | F01L 1/047 29/888.1 |

FOREIGN PATENT DOCUMENTS

| | | |
|---|---|---|
| JP | 2004-256903 A | 9/2004 |
| JP | 2008-031999 A | 2/2008 |

\* cited by examiner

REPAIR METHOD OF ROTOR

BACKGROUND OF THE INVENTION

Field of the Invention

The present disclosure relates to a repair method of a rotor.

Priority is claimed on Japanese Patent Application No. 2023-121995, filed on Jul. 26, 2023, the content of which is incorporated herein by reference.

Description of Related Art

Generally, a centrifugal compressor includes a rotor including a plurality of impellers and a casing that forms a flow passage between the impellers and the casing by covering the impellers from an outside. In the centrifugal compressor, a fluid supplied from the outside through the flow passage formed in the casing is compressed by the rotation of the impellers. In a case in which the rotor of such a compressor is damaged, the rotor may be repaired without creating a new rotor.

For example, Patent Document 1 describes a repair method of forming a thermal spray coating on a damaged portion to repair the damaged portion. Specifically, in the repair method described in Patent Document 1, first, a damaged portion of a rotor generated at a portion supported by a bearing is removed and shaped by machining or the like. Thereafter, a surface on which removing and shaping has been performed is roughened by blast treatment, and a coating is formed by high-velocity flame spraying. The formed coating is finished by machining and inspected, to obtain the repaired rotor.

CITATION LIST

Patent Document

[Patent Document 1] Japanese Unexamined Patent Application, First Publication No. 2004-256903

SUMMARY OF THE INVENTION

Meanwhile, in the repair of the rotor as described above, in a case in which the heat treatment is not performed on the welded portion, there is a possibility that the welded portion may have insufficient strength or excessive hardness as compared with other non-welded portions. As a result, the rotor after the repair may be in a state in which the required performance is not satisfied. On the other hand, in a case in which the heat treatment is performed on a large component such as the rotor, the dimension of the rotor may be changed before and after the repair, and it may be difficult to obtain a rotor having the same shape as that before the repair. In this way, during the repair of the rotor, it is required to maintain the shape and the performance with respect to the rotor before and after the repair.

The present disclosure provides a repair method of a rotor with which the shape and the performance can be maintained with respect to the rotor after the repair.

The present disclosure provides a repair method of a rotor including a rotor body extending in an axial direction about an axis and a plurality of impellers arranged in the axial direction and fixed to the rotor body, the repair method including: a step of performing welding on a repair area of the rotor body to fill a damaged portion formed to be recessed from an outer surface of the rotor body with a welded portion; a step of performing heat treatment only on the repair area in the rotor after the welding is performed; and a step of scraping a part of the welded portion after the heat treatment is performed, to form a processing surface smoothly connected to the outer surface.

With the repair method of the rotor according to the present disclosure, the shape and the performance can be stably maintained with respect to the rotor after the repair.

DETAILED DESCRIPTION OF THE INVENTION

Hereinafter, an embodiment for performing a repair method S1 of a rotor according to the present disclosure will be described with reference to the accompanying drawings. However, the present disclosure is not limited only to the embodiment.

The repair method S1 of the rotor is a method of repairing an axial end area 100 including an end of a rotor 1. The rotor 1 that is a repair target is a rotating component of a rotary machine such as a compressor or a steam turbine. The rotor 1 according to the present embodiment is the rotor 1 of a multi-stage centrifugal compressor.

(Configuration of Rotor)

Figure 1:
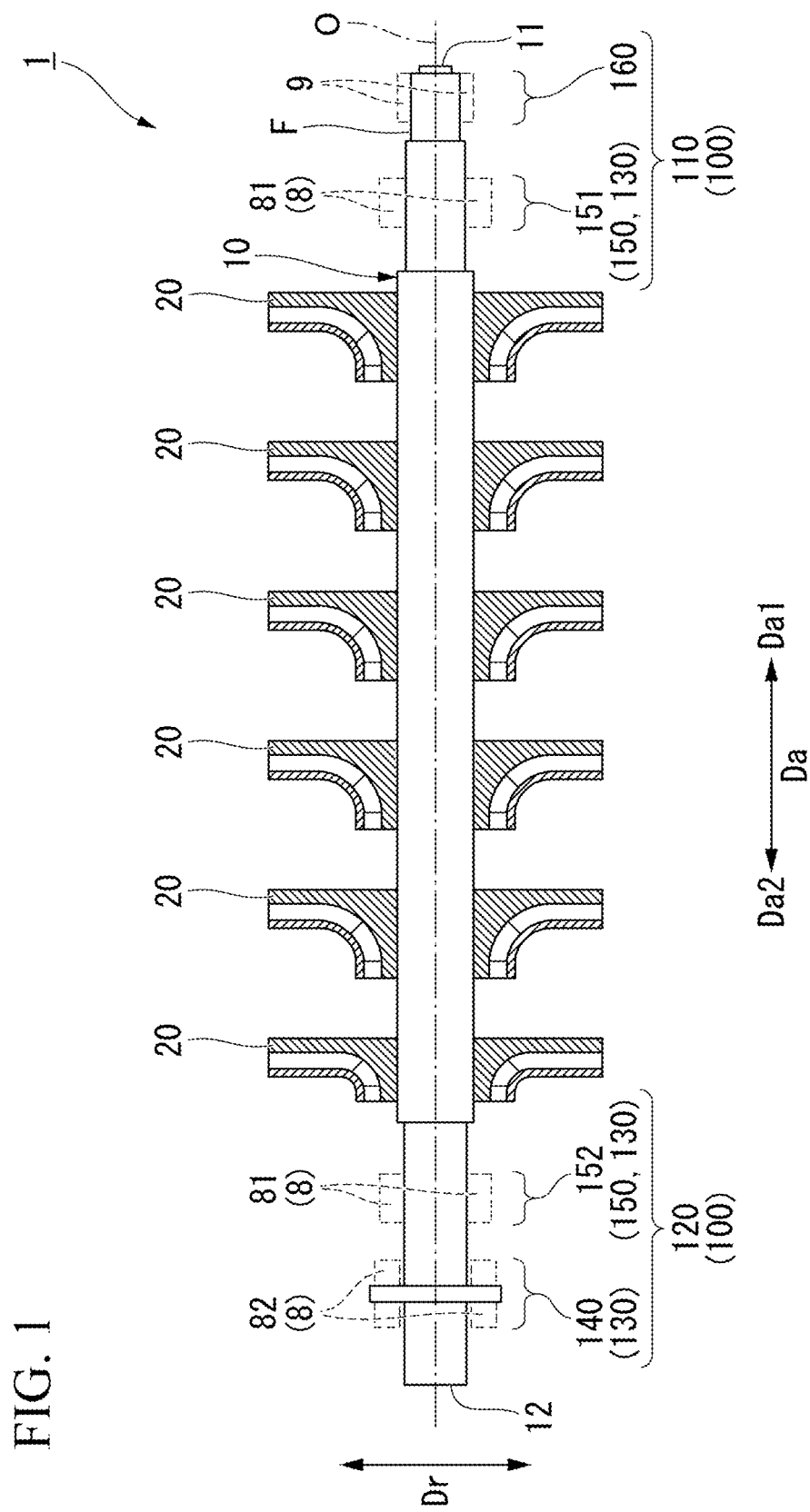
FIG. 1 is a schematic view showing a rotor of a repair target according to the present embodiment.

As shown in FIG. 1, the rotor 1 is a component that is rotatable about an axis O in a casing (not shown). The rotor 1 includes a rotor body 10 and impellers 20. The rotor body 10 extends in an axial direction Da about the axis O.

Hereinafter, a direction in which the axis O extends is referred to as the axial direction Da. In a state in which the rotor 1 is generated in the rotary machine, the axis O extends horizontally. A direction orthogonal to the axial direction Da is defined as a radial direction Dr. That is, the radial direction Dr of the rotor 1 with respect to the axis O is simply referred to as the radial direction Dr.

A plurality of impellers 20 are arranged with intervals therebetween in the axial direction Da. Each impeller 20 is fixed to the rotor body 10. Each impeller 20 is rotatable about the axis O integrally with the rotor body 10. In the present embodiment, for example, six impellers 20 are provided in total. The impellers 20 are disposed at a central portion of the rotor body 10 in the axial direction Da between a side close to a first end 11 of the rotor body 10 (first end side Da1, one side) and a side close to a second end 12 of the rotor body 10 (second end side Da2, the other side) in the axial direction Da.

The rotor body 10 has the axial end area 100 including the end of the rotor body 10 in the axial direction Da. The axial end area 100 is an area in a certain range from the end in the axial direction Da. The rotor body 10 according to the present embodiment includes a first axial end area 110 including the first end 11, which is one end in the axial direction Da, and a second axial end area 120 including the second end 12, which is the other end in the axial direction Da. The first axial end area 110 and the second axial end area 120 are formed to be separated from each other in the axial direction Da with the central portion interposed therebetween. The first axial end area 110 and the second axial end area 120 are formed at positions that do not overlap with the impeller 20 in the axial direction Da.

In addition, the rotor body 10 can be rotatably supported by the casing via a bearing 8. The rotor body 10 has a bearing area 130 supported by the bearing 8. The bearing 8 that supports the rotor body 10 includes a thrust bearing 81 that restricts a displacement of the rotor body 10 in a thrust direction, and a pair of journal bearings 82 that rotatably support the rotor body 10. That is, the rotor body 10 has a thrust supported area 140 supported by the thrust bearing 81, and a journal supported area 150 supported by the journal bearing 82.

The thrust supported area 140 is formed as a part of the second axial end area 120. The thrust supported area 140 is formed at a position away from the second end 12 in the axial direction Da. The journal supported area 150 includes a first journal supported area 151 and a second journal supported area 152 that are separated from each other in the axial direction Da. The first journal supported area 151 is formed as a part of the first axial end area 110. The first journal supported area 151 is formed at a position away from the first end 11 in the axial direction Da. The second journal supported area 152 is formed as a part of the second axial end area 120. The second journal supported area 152 is formed at a position away from the second end 12 and the thrust supported area 140 in the axial direction Da.

In addition, the coupling member 9 is attachable to the first end 11 of the rotor body 10. The coupling member 9 can be attached to and detached from another rotary machine (not shown) disposed outside the casing, in addition to the first end 11 of the rotor body 10. The rotor body 10 has a coupling fixed area 160 in which the coupling member 9 can be fixed. The coupling fixed area 160 is formed as a part of the first axial end area 110. The coupling fixed area 160 is formed at a position away from the first end 11 in the axial direction Da. The coupling fixed area 160 is formed at a position between the first journal supported area 151 and the first end 11 in the axial direction Da.

(Repair Method of Rotor)

The repair method S1 of the rotor will be described with reference to FIG. 2. The repair method S1 of the rotor according to the present embodiment is performed on the rotor 1 removed from the casing. In the repair method S1 of the rotor, a damaged portion D including a scratch or the like formed on an outer surface F of the rotor 1 in the axial end area 100 is repaired. The repair method S1 of the rotor includes a damaged portion check step S2, a damaged portion processing step S3, a repair area welding step S4, a partial heat treatment step S5, and a processing surface formation step S6.

(Damaged Portion Check Step)

Figure 3:
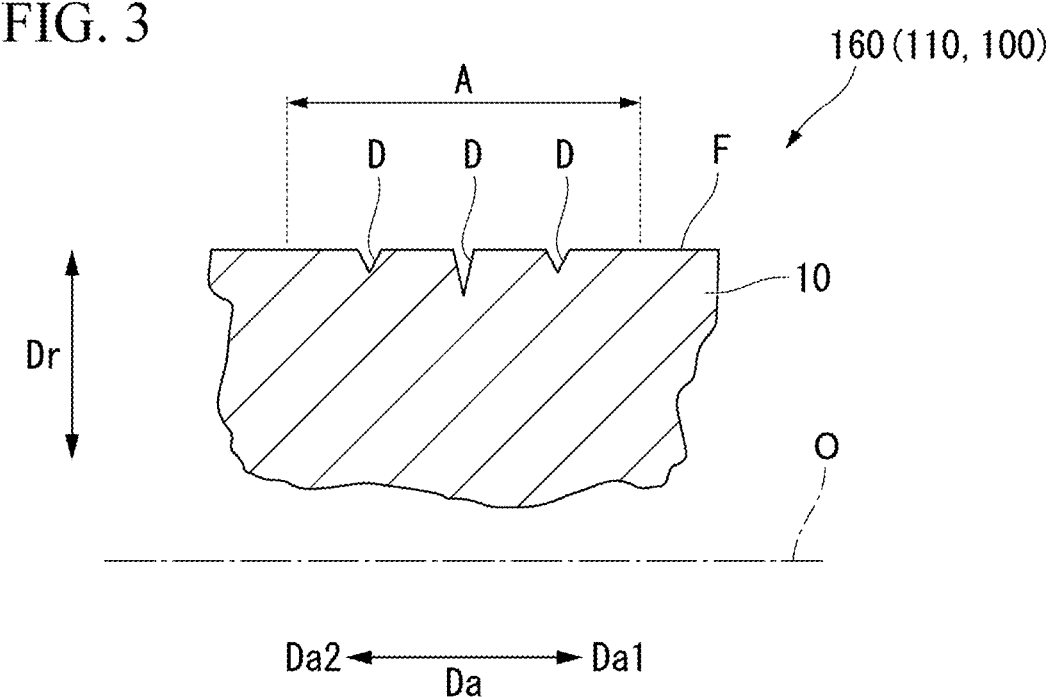
FIG. 3 is an enlarged view showing a main part of a rotor body in order to show a step of checking a damaged portion according to the present embodiment.

In the damaged portion check step S2, the damaged portion D formed in the axial end area 100 of the rotor 1 is checked. For example, a worker visually recognizes the rotor 1 and checks whether or not the damaged portion D is formed in the axial end area 100. In the present embodiment, as shown in FIG. 3, a case in which the damaged portion D is present in the coupling fixed area 160 of the first axial end area 110 will be described as an exemplary example. A damaged area in the coupling fixed area 160 is formed by attaching and detaching the coupling member 9 to and from the rotor body 10 due to the coupling member 9 fixed to the rotor body 10 by oil pressure fitting, shrink fitting, or the like. The damaged portion D is formed to be recessed from the outer surface F of the rotor body 10. In addition, a repair area A to be repaired is formed in the axial end area 100. The repair area A to be repaired is an area including the damaged portion D in the rotor body 10. That is, in the present embodiment, a predetermined range including a area in which the damaged portion D is present in the coupling fixed area 160 is set as the repair area A.

(Damaged Portion Processing Step)

Figure 2:
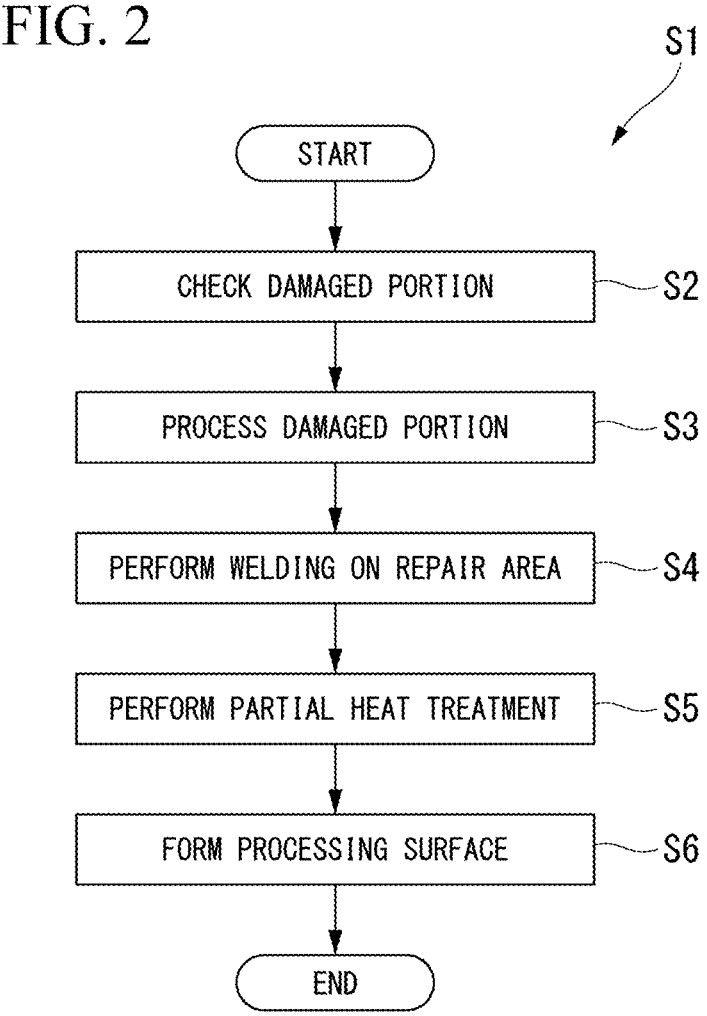
FIG. 2 is a flowchart showing a repair method of the rotor according to the present embodiment.
Figure 4:
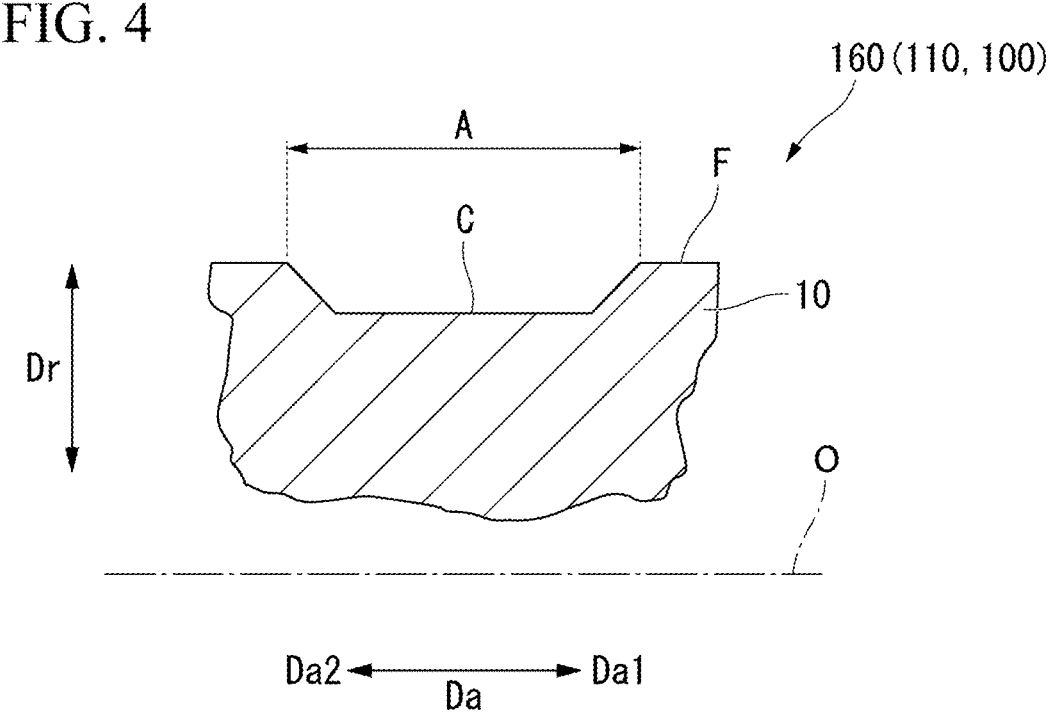
FIG. 4 is an enlarged view showing the main part of the rotor body in order to show a step of processing the damaged portion according to the present embodiment.

The damaged portion processing step S3 is performed after the damaged portion check step S2, as shown in FIG. 2. As shown in FIG. 4, in the damaged portion processing step S3, the damaged portion D is scraped, and the repair area A is formed as a recess portion C recessed from the outer surface F. The recess portion C is formed over the entire circumference of the rotor body 10. The recess portion C is formed such that the damaged portion D is completely scraped from the rotor body 10. The recess portion C is formed in a range larger than a position at which the damaged portion D is formed. That is, in a state in which the recess portion C is formed, the damaged portion D is not present in the rotor body 10. In the present embodiment, the recess portion C is formed in the coupling fixed area 160.

(Repair Area Welding Step)

Figure 5:
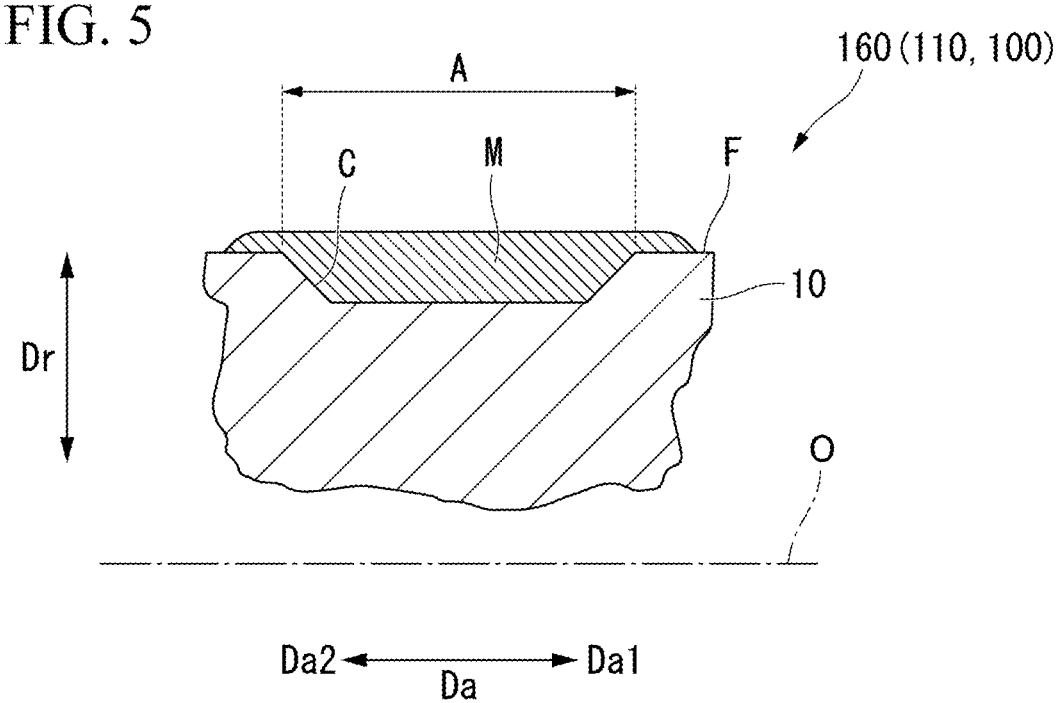
FIG. 5 is an enlarged view showing the main part of the rotor body in order to show a step of welding a repair area according to the present embodiment.

In the repair area welding step S4, the welding is performed on the repair area A. As shown in FIG. 2, the repair area welding step S4 according to the present embodiment is performed after the damaged portion processing step S3. In the repair area welding step S4, as shown in FIG. 5, the welding is performed on the repair area A in the axial end area 100, and the damaged portion D is filled with the welded portion M. In the present embodiment, the welding is performed such that the recess portion C formed in the coupling fixed area 160 is filled with the welded portion M. That is, the welded portion M is formed over the entire circumference of the rotor body 10. The welded portion M is formed by performing padding around the entire circumference of the recess portion C by laser welding. The welded portion M is formed with a thickness such that the welded portion M protrudes from the outer surface F in the radial direction Dr.

(Partial Heat Treatment Step)

Figure 6:
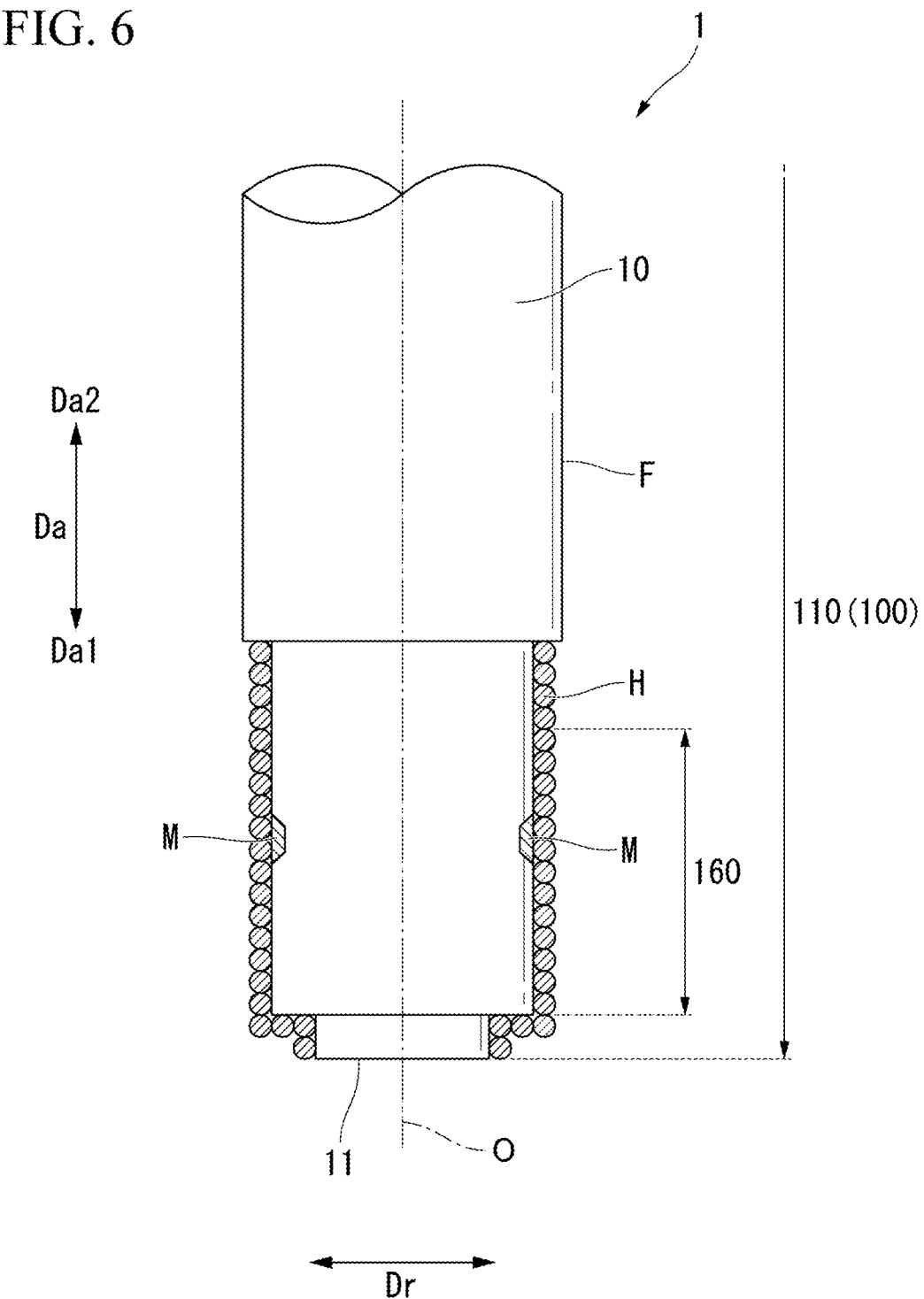
FIG. 6 is an enlarged view showing the main part of the main part of the rotor body in order to show a state in which a heater is attached in a step of performing a partial heat treatment according to the present embodiment.
Figure 7:
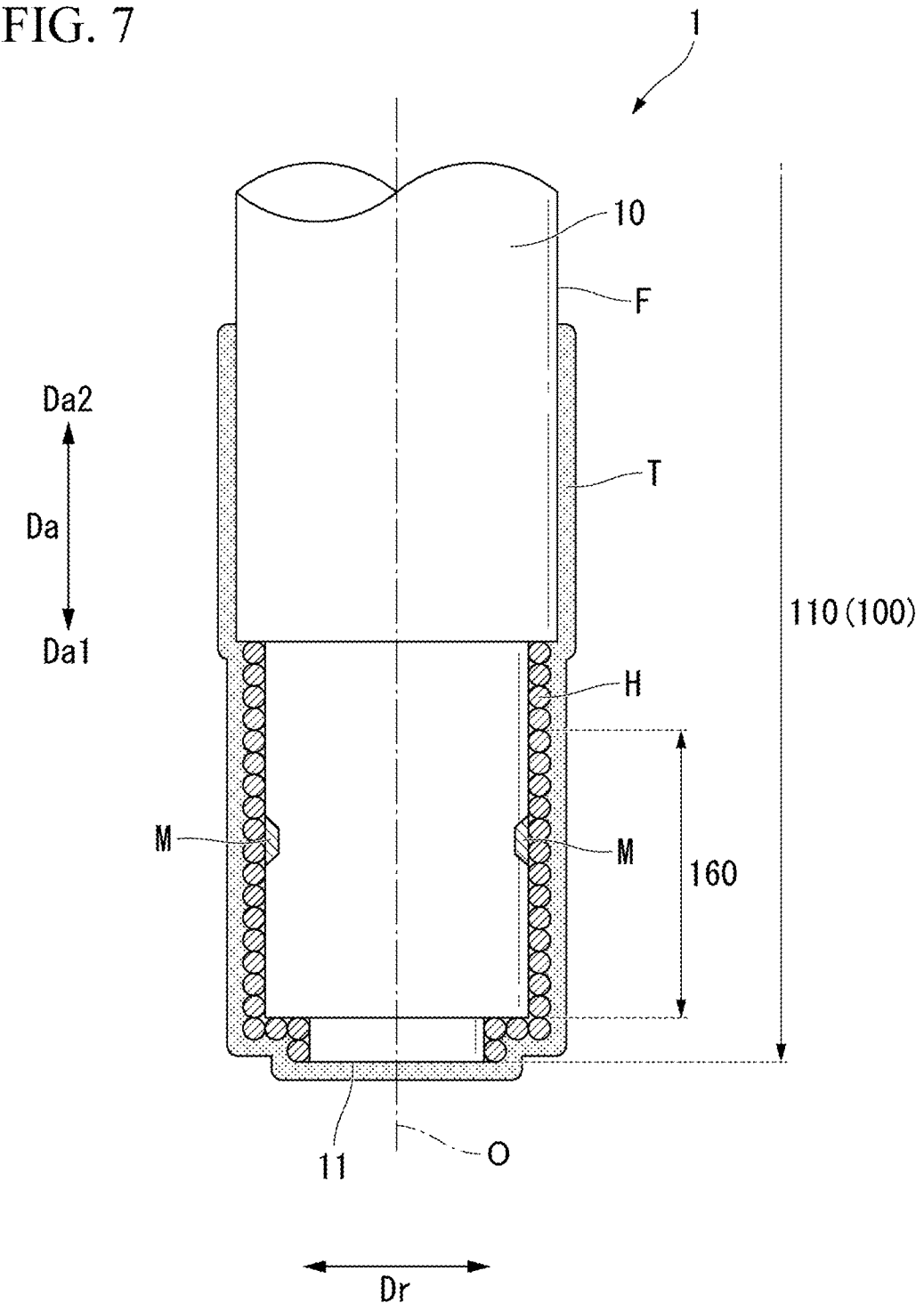
FIG. 7 is an enlarged view showing the main part of the main part of a rotor body in order to show a state in which a thermal insulating material is attached in the step of performing the partial heat treatment according to the present embodiment.

The partial heat treatment step S5 is performed after the repair area welding step S4 as shown in FIG. 2. In the partial heat treatment step S5, the heat treatment is performed only on the axial end area 100 in the rotor 1 after the welding is performed. Specifically, as shown in FIG. 6, the heat treatment is performed only on the first axial end area 110. More specifically, in the present embodiment, only the coupling fixed area 160, which is the repair area A, is treated. The heat treatment is performed by annealing. That is, the coupling fixed area 160 is gradually heated to a designated temperature at a constant rate, kept warm for a predetermined time, and then gradually cooled at a constant rate. In the present embodiment, a heater H composed of a nichrome wire or the like is wound around only the coupling fixed area 160, which is a heat treatment target area, without any gap. Thereafter, as shown in FIG. 7, a heat insulating material T is wound to cover the coupling fixed area 160 together with the heater H. In this way, in a state in which the heater H and the heat insulating material T are attached to the coupling fixed area 160 including the welded portion M, annealing is performed only on the coupling fixed area 160 in the rotor 1 over the entire circumference. In this case, annealing conditions during the heat treatment are preferably set to conditions in which the coupling fixed area 160 after the heat treatment satisfies a Charpy value required for a low-temperature material.

It is preferable that the partial heat treatment step S5 is performed after the heat influence due to the welding is completely removed from the rotor 1. It is preferable that the partial heat treatment step S5 is performed by standing the rotor 1 such that the axis O extends in a vertical direction.

(Processing Surface Formation Step)

Figure 8:
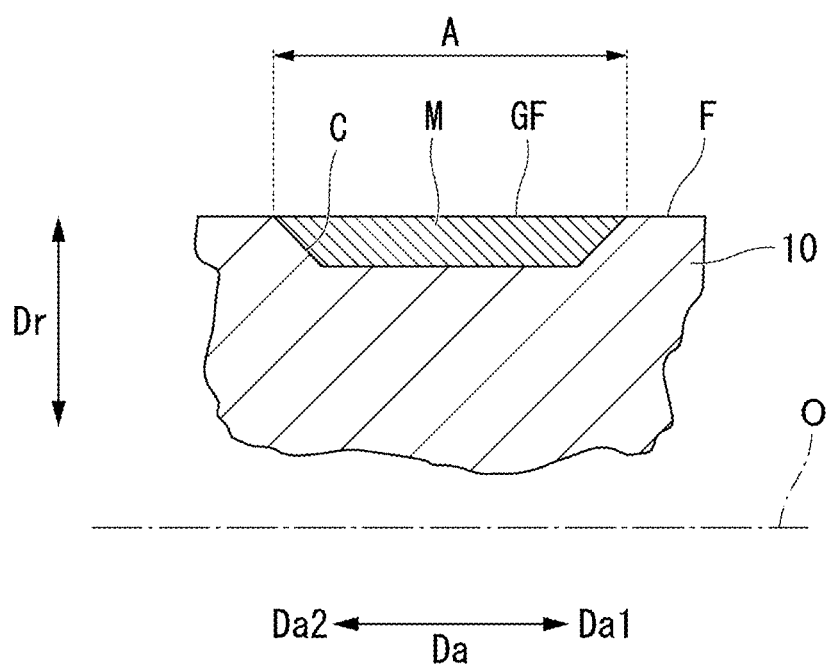
FIG. 8 is an enlarged view showing the main part of the rotor body in order to show a step of forming a processing surface according to the present embodiment.

The processing surface formation step S6 is performed after the partial heat treatment step S5, as shown in FIG. 2. In the processing surface formation step S6, as shown in FIG. 8, after the heat treatment is performed, a part of the welded portion M is scraped to form a processing surface GF. The processing surface GF is formed by performing polishing on the welded portion M. The processing surface formation step S6 is not performed before the partial heat treatment step S5.

The processing surface GF is a surface smoothly connected to the outer surface F. The processing surface GF is formed at a position overlapping a position at which the welded portion M is formed in the axial direction Da. The processing surface GF is a smooth surface that is connected to the outer surface F at a position at which the recess portion C is not formed in the axial direction Da. The processing surface GF is formed over the entire circumference of the rotor body 10 at a certain distance from the axis O in the radial direction Dr.

Actions and Effects

In the repair method S1 of the rotor having the above-described configuration, the welding is performed on the damaged portion D to form the welded portion M. As a result, the damaged portion D is in a state of being filled with the welded portion M and repaired. However, in a case in which only the welding is performed, the strength of the welded portion M and the heat-affected portion in the vicinity thereof may be insufficient as compared with the required strength, or the hardness of the heat-affected portion may exceed the required hardness. On the other hand, by performing the heat treatment, the strength of the heat-affected portion can be increased to satisfy the required value, and the hardness can be decreased. In this case, the heat treatment is performed only on the first axial end area 110 including the repair area A in which the welded portion M is formed, without performing the heat treatment on the entire rotor 1 or the entire rotor body 10. By not heating the entire rotor 1 or the entire rotor body 10, the influence of thermal expansion, thermal contraction, strain, and the like due to the heat treatment can be limited to the vicinity of the repair area A. That is, a range in which a change in dimension or surface roughness due to the influence of the heat treatment occurs can be suppressed to only the vicinity of the repair area A. Further, the partial heat treatment is performed only on the first axial end area 110 including the repair area A, and then a part of the welded portion M is scraped to form the processing surface GF. Therefore, the change in dimension or surface roughness that occurs only in the first axial end area 110 can be corrected by the scraping. In addition, since the heat treatment is not performed after the processing surface GF is formed, the occurrence of the change in dimension or surface roughness of the processing surface GF once formed is suppressed. As a result, the rotor 1 having the same quality and shape as those before the repair can be stably obtained. Therefore, the shape and the performance can be stably maintained with respect to the rotor 1 after the repair.

In particular, in the present embodiment, the heat treatment is performed only on the first axial end area 110. As a result, it is possible to limit the influence of thermal expansion, thermal contraction, strain, and the like due to the heat treatment, to the first axial end area 110. That is, the range in which the change in dimension or surface roughness due to the influence of the heat treatment occurs can be suppressed to only the first axial end area 110.

In addition, the processing surface GF is formed over the entire circumference of the rotor body 10 at a certain distance from the axis O in the radial direction Dr. Therefore, the repair area A in which the welded portion M is formed (area in which the damaged portion D is originally present) can be processed to be restored to the original shape with high accuracy over the entire circumference. Therefore, the rotor 1 having the same shape as that before the repair can be more stably obtained.

In addition, the welded portion M is formed by the laser welding. In particular, the laser welding is performed on the entire circumference of the rotor body 10. Therefore, the heat influence due to the welding is larger in the rotor body 10 than that in a case in which a part thereof is welded. Further, in the welding method having a large amount of heat input, such as TIG welding, the heat influence on the rotor body 10 is further increased. However, by adopting the laser welding, it is possible to suppress the amount of heat input during the welding and to suppress the heat influence generated in the rotor body 10. As a result, the deformation of the rotor body 10 caused by the welding can be suppressed.

In addition, in a case in which the partial heat treatment is performed only on the coupling fixed area 160, the annealing is performed. Therefore, the residual stress or the like generated in the coupling fixed area 160 by forming the welded portion M can be removed. As a result, a crystal structure can be made uniform and soft in the repair area A in which the welded portion M is formed, and the workability or the toughness can be improved.

In addition, the annealing is performed by winding the heater H and the heat insulating material T around the coupling fixed area 160. After being heated by the heater H, the coupling fixed area 160 is kept warm by the heat insulating material T. Therefore, heat is less likely to be transferred to an area other than the coupling fixed area 160 in which the heat insulating material T is not applied, and an influence of the heat treatment is less likely to occur in the area other than the coupling fixed area 160. Therefore, the influence on the entire rotor body 10 can be suppressed, and the coupling fixed area 160 can be effectively annealed.

In addition, the repair area A is the area including the damaged portion D formed to be recessed from the outer surface F of the rotor body 10. Therefore, the damaged portion D such as a scratch formed on the rotor body 10 can be completely removed and then repaired.

Further, the damaged portion D is scraped to form the recess portion C. In addition, the welded portion M is formed to fill the recess portion C. Therefore, the damaged portion D can be reliably removed and repaired regardless of the shape of the damaged portion D. Further, since the recess portion C is formed to be scraped from the outer surface F, the welded portion M is more likely to adhere to the repair area A than in a case in which the welded portion M is directly formed on the damaged portion D, and the welded portion M can be stably formed.

OTHER EMBODIMENTS

While preferred embodiments of the invention have been described and illustrated above, it should be understood that these are exemplary of the invention and are not to be considered as limiting. Additions, omissions, substitutions, and other modifications can be made without departing from the scope of the invention. Accordingly, the invention is not to be considered as being limited by the foregoing description and is only limited by the scope of the appended claims.

For example, the rotor 1 as the repair target is not limited to the rotor 1 having the above-described structure. The rotor 1 may have a different shape as long as it is a rotor 1 of the rotary machine. Therefore, the number of the impellers 20 provided in the rotor body 10 and the orientation of the impellers 20 are not limited to the examples described above, and can be appropriately changed.

In addition, the repair method S1 of the rotor is not limited to being performed only in a case in which the damaged portion D is formed in the coupling fixed area 160. The damaged portion D may be formed in the bearing area 130 or the second axial end area 120 as long as the damaged portion D is formed in the axial end area 100.

In addition, in the repair method S1 of the rotor, the damaged portion processing step S3 is not limited to being always performed. For example, the damaged portion processing step S3 need not be performed. In that case, in the repair area welding step S4, the direct welding is performed on the damaged portion D, and the welded portion M is formed to directly cover the damaged portion D.

In addition, in the repair method S1 of the rotor, the partial heat treatment step S5 is not limited to being performed only once as in the present embodiment. The partial heat treatment step S5 may be performed a plurality of times as long as the partial heat treatment step S5 is performed before the processing surface formation step S6.

Supplementary Note

The repair method S1 of the rotor according to the embodiment is understood, for example, as follows.

(1) A first aspect relates to a repair method S1 of a rotor including a rotor body 10 extending in an axial direction Da about an axis O and a plurality of impellers 20 arranged in the axial direction Da and fixed to the rotor body 10, the repair method S1 including: a step of performing welding on a repair area A of the rotor body 10 to fill a damaged portion D formed to be recessed from an outer surface F of the rotor body 10 with a welded portion M; a step of performing heat treatment only on the repair area A in the rotor 1 after the welding is performed; and a step of scraping a part of the welded portion M after the heat treatment is performed, to form a processing surface GF smoothly connected to the outer surface F.

In such a repair method S1 of a rotor, the welding is performed on the damaged portion D to form the welded portion M. As a result, the damaged portion D is in a state of being filled with the welded portion M and repaired. However, in a case in which only the welding is performed, the strength of the welded portion M and the heat-affected portion in the vicinity thereof may be insufficient as compared with the required strength, or the hardness of the heat-affected portion may exceed the required hardness. On the other hand, by performing the heat treatment, the strength of the heat-affected portion can be increased to satisfy the required value, and the hardness can be decreased. In this case, the heat treatment is performed only on the repair area A in which the welded portion M is formed, without performing the heat treatment on the entire rotor 1 or the entire rotor body 10. By not heating the entire rotor 1 or the entire rotor body 10, the influence of thermal expansion, thermal contraction, strain, and the like due to the heat treatment can be limited to the repair area A. That is, the range in which the change in dimension or surface roughness due to the influence of the heat treatment occurs can be suppressed to only the repair area A. Further, after the partial heat treatment is performed only on the repair area A, a part of the welded portion M is scraped to form the processing surface GF. Therefore, the change in dimension or surface roughness that occurs only in the repair area A can be corrected by the scraping. In addition, since the heat treatment is not performed after the processing surface GF is formed, the occurrence of the change in dimension or surface roughness of the processing surface GF once formed is suppressed. As a result, the rotor 1 having the same quality and shape as those before the repair can be stably obtained. Therefore, the shape and the performance can be stably maintained with respect to the rotor 1 after the repair.

(2) A second aspect relates to the repair method S1 of a rotor according to (1), in which the repair area A is formed in an axial end area 100 including an end of the rotor body 10 in the axial direction Da.

As a result, it is possible to limit the influence of thermal expansion, thermal contraction, strain, and the like due to the heat treatment, to the axial end area 100. That is, the range in which the change in dimension or surface roughness due to the influence of the heat treatment occurs can be suppressed to only the axial end area 100.

(3) A second aspect relates to the repair method S1 of a rotor according to (1) or (2), in which the processing surface GF is formed at a certain distance from the axis O over an entire circumference of the rotor body 10.

As a result, the repair area A in which the welded portion M is formed can be processed to be restored to the original shape with high accuracy over the entire circumference. Therefore, the rotor 1 having the same shape as that before the repair can be more stably obtained.

(4) A third aspect relates to the repair method S1 of a rotor according to any one of (1) to (3), in which the welded portion M is formed by laser welding.

By adopting the laser welding in this way, the amount of heat input during the welding can be suppressed, and the heat influence generated in the rotor body 10 can be suppressed. As a result, the deformation of the rotor body 10 caused by the welding can be suppressed.

(5) A fourth aspect relates to the repair method S1 of a rotor according to any one of (1) to (4), in which the heat treatment is annealing.

As a result, the residual stress or the like generated in the repair area A by forming the welded portion M can be removed. As a result, the crystal structure can be made uniform and soft in the repair area A in which the welded portion M is formed, and the workability or the toughness can be improved.

(6) A fifth aspect relates to the repair method S1 of a rotor according to any one of (1) to (5), further including: a step of scraping the damaged portion D to form the repair area A as a recess portion C recessed from the outer surface F, in which the welding is performed such that the recess portion C is filled with the welded portion M.

INDUSTRIAL APPLICABILITY

As a result, the damaged portion D can be reliably removed and repaired regardless of the shape of the damaged portion D. Further, since the recess portion C is formed to be scraped from the outer surface F, the welded portion M is more likely to adhere to the repair area A than in a case in which the welded portion M is directly formed on the damaged portion D, and the welded portion M can be stably formed.

With the repair method of the rotor according to the present disclosure, the shape and the performance can be stably maintained with respect to the rotor after the repair.

EXPLANATION OF REFERENCES

1: rotor
O: axis
20: impeller
10: rotor body
11: first end
12: second end
100: axial end area
110: first axial end area
120: second axial end area
130: bearing area
140: thrust supported area
150: journal supported area
151: first journal supported area
152: second journal supported area
160: coupling fixed area
F: outer surface
8: bearing
81: thrust bearing
82: journal bearing
9: coupling member
D: damaged portion
Da: axial direction
Da1: first end side
Da2: second end side
Dr: radial direction
S1: repair method of rotor
S2: damaged portion check step
S3: damaged portion processing step
S4: repair area welding step
S5: partial heat treatment step
S6: processing surface formation step
A: repair area
C: recess portion
M: welded portion
H: heater
T: heat insulating material
GF: processing surface

What is claimed is:

1. A repair method of a rotor including a rotor body extending in an axial direction about an axis and a plurality of impellers arranged in the axial direction and fixed to the rotor body, the repair method comprising:
   a step of performing welding on a repair area of the rotor body to fill a damaged portion formed to be recessed from an outer surface of the rotor body with a welded portion;
   a step of performing annealing treatment only on the repair area in the rotor after the welding is performed; and
   a step of scraping a part of the welded portion after the annealing treatment is performed, to form a processing surface smoothly connected to the outer surface, wherein
   the repair area is formed in an axial end area including an end of the rotor body in the axial direction,
   the processing surface is formed at a certain distance from the axis over an entire circumference of the rotor body, and
   the annealing treatment comprises:
      winding a heater around only the repair area;
      winding a heat insulating material to cover the repair area together with the heater; and
      performing annealing only on the repair area over an entire circumference in a state in which the heater and the heat insulating material are attached to the repair area including the welded portion.

2. The repair method of a rotor according to claim 1, wherein the welded portion is formed by laser welding.

3. The repair method of a rotor according to claim 1, further comprising:
   a step of scraping the damaged portion to form the repair area as a recess portion recessed from the outer surface, wherein
   the welding is performed such that the recess portion is filled with the welded portion.

4. The repair method of a rotor according to claim 1, wherein annealing conditions during the annealing treatment are set to conditions in which the repair area after the annealing treatment satisfies a Charpy value required for a low-temperature material.

* * * * *